US010093256B2

(12) United States Patent
Wolf

(10) Patent No.: US 10,093,256 B2
(45) Date of Patent: Oct. 9, 2018

(54) VEHICLE LOAD INTRODUCTION SYSTEM

(71) Applicant: Dr. Ing. h.c. F. Porsche Aktiengesellschaft, Stuttgart (DE)

(72) Inventor: Ruediger Wolf, Bretten (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 15/677,061

(22) Filed: Aug. 15, 2017

(65) Prior Publication Data

US 2018/0056907 A1 Mar. 1, 2018

(30) Foreign Application Priority Data

Aug. 31, 2016 (DE) ........................ 10 2016 116 172

(51) Int. Cl.
*B60R 19/34* (2006.01)
*B62D 21/15* (2006.01)
*B60R 19/26* (2006.01)

(52) U.S. Cl.
CPC ............ *B60R 19/34* (2013.01); *B62D 21/152* (2013.01); *B60R 2019/262* (2013.01)

(58) Field of Classification Search
CPC .............................. B60R 19/34; B62D 21/152
USPC ................................................... 293/132, 133
See application file for complete search history.

(56) References Cited

U.S. PATENT DOCUMENTS

| 2009/0079210 A1 | 3/2009 | Matsumura | |
| 2015/0061307 A1* | 3/2015 | Nakanishi | B60R 19/34 |
| | | | 293/133 |
| 2015/0360633 A1* | 12/2015 | Nishida | B62D 21/152 |
| | | | 293/133 |
| 2015/0375701 A1* | 12/2015 | Rottger | B60R 19/18 |
| | | | 293/133 |

FOREIGN PATENT DOCUMENTS

| DE | 19907783 A1 | 8/2000 |
| DE | 10234045 A1 | 2/2004 |
| DE | 10321766 A1 | 12/2004 |

* cited by examiner

*Primary Examiner* — Joseph D. Pape
(74) *Attorney, Agent, or Firm* — Leydig, Voit & Mayer, Ltd.

(57) ABSTRACT

A load introduction system of a vehicle for introducing a load counter to the direction of travel of the vehicle includes a left load support on a left side of the vehicle and a right load support on a right side of the vehicle, wherein the left load support is connected in a force-transmitting manner to a left deformation module on the left side of a front portion of the vehicle and the right load support is connected in a force-transmitting manner to a right deformation module on the right side of the front portion. The load introduction system also includes a crossmember which extends transversely with respect to the direction of travel of the vehicle, wherein the crossmember is connected in a force-transmitting manner to the two deformation modules.

10 Claims, 5 Drawing Sheets

VEHICLE LOAD INTRODUCTION SYSTEM

CROSS REFERENCE TO RELATED APPLICATIONS

This application claims benefit to German Patent Application No. DE 10 2016 116 172.1, filed Aug. 31, 2016, which is hereby incorporated by reference herein.

FIELD

The present invention relates to a load introduction system of a vehicle for introducing a load counter to the direction of travel of the vehicle.

BACKGROUND

It is basically known that mechanical precautions are taken in vehicles in order, in the event of a crash situation, i.e. the contact of a vehicle with a stationary or moving object, to carry away the incoming load. Such load introduction systems are in use, for example, in order, in the event of an accident situation from the front side of the vehicle, to guide the force past the vehicle compartment. The vehicle compartment or the passenger compartment in the interior of the vehicle is customarily separated off by what is referred to as a bulkhead partition. Mechanical components should basically be prevented here from entering said interior and passing through said bulkhead partition into the region of the passengers.

A disadvantage of the known solutions is that more frequently only a linear or substantially linear deformation of correspondingly central load supports of the vehicle body is possible. This is described, for example, in DE 103 21 766 A1. Although the prior art is basically concerned with introducing the load into the vehicle body in an advantageous manner, this continues to lead in individual crash situations to problems. One such crash situation is what is referred to as a central pillar. If the latter strikes against the vehicle from the front, this leads not only to a load admission counter to the direction of travel, but in addition also to tensile loadings transversely with respect to the vehicle. Said high tensile loadings have to be transmitted between the individual components of the body by corresponding weld seams or other non-positive connections. In order to ensure that, even in a crash situation with a pillar, no case of failure of the body occurs, a correspondingly stable design has to be selected. This leads to increased costs, to increased weight and to an increased outlay on production.

SUMMARY

In an embodiment, the present invention provides a load introduction system of a vehicle for introducing a load counter to the direction of travel of the vehicle. The load introduction system includes a left load support on a left side of the vehicle and a right load support on a right side of the vehicle, wherein the left load support is connected in a force-transmitting manner to a left deformation module on the left side of a front portion of the vehicle and the right load support is connected in a force-transmitting manner to a right deformation module on the right side of the front portion. The load introduction system also includes a crossmember which extends transversely with respect to the direction of travel of the vehicle, wherein the crossmember is connected in a force-transmitting manner to the two deformation modules.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
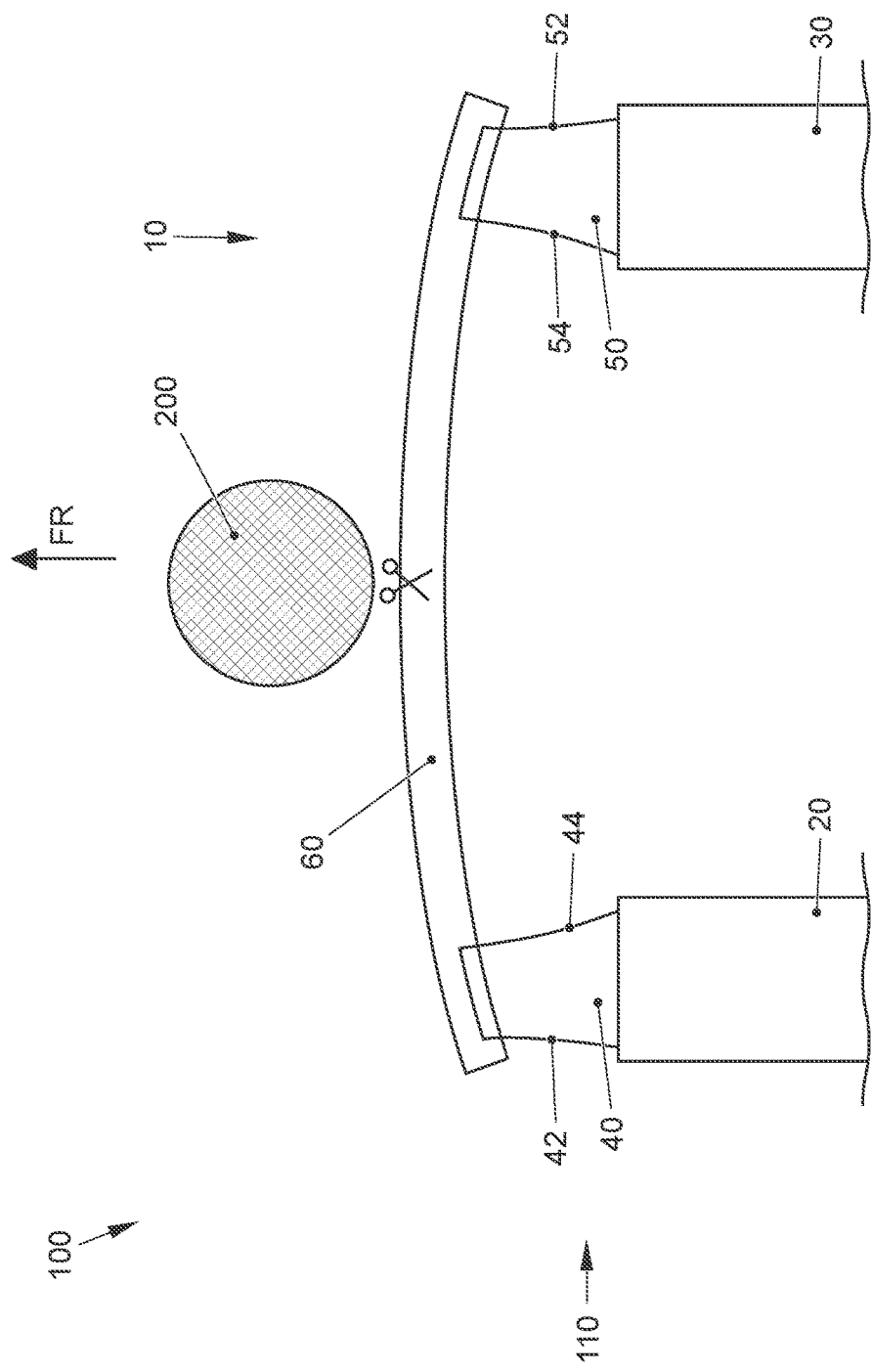
FIG. 1 shows an embodiment of a load introduction system according to the invention before the striking of a central object.

Embodiments of the invention described herein can at least partially eliminate the above-described disadvantages. In particular, embodiments of the present invention can protect the interior of the vehicle in a cost-effective and simple manner using little material.

A load introduction system of a vehicle for introducing a load counter to the direction of travel of the vehicle is described herein. For this purpose, the load introduction system has a left load support on the left side of the vehicle and a right load support on the right side of the vehicle. The left load support is connected in a force-transmitting manner to a left deformation module on the left side of a front portion of the vehicle. Furthermore, the right load support is connected in a force-transmitting manner to a right deformation module on the right side of the front portion. A crossmember which extends transversely with respect to the direction of travel of the vehicle is connected in a force-transmitting manner to the two deformation modules.

A load introduction system according to an embodiment of the invention includes three different components. At the frontmost point here is the crossmember which can be formed, for example, by the bumper of a vehicle or is arranged behind such a bumper. The bumper in the form of the crossmember is now connected at its two end portions to one deformation module each. This connection is configured in a force-transmitting manner, and therefore force can be transmitted from the crossmember to the respective deformation module in particular counter to the direction of travel. Within the scope of this application, the reference points on the left and on the right should be understood here by means of a top view of the vehicle looking in the direction of travel.

The deformation modules in turn are connected to the body in a force-transmitting manner via the load supports. The load supports here can already constitute parts of the body. The load supports are preferably arranged along the direction of travel and accordingly extend perpendicularly or transversely with respect to the crossmember according to the load introduction system according to the invention.

A load introduction system according to an embodiment of the invention can absorb known crash situations and introduce the corresponding load in such a crash situation into the body. However, in addition to the known solutions, improved carrying away of the load is also possible in the particular case of a crash situation with a central pillar. This is explained in more detail below.

As soon as a central action of force by a pillar strikes against the crossmember, this leads to the corresponding load no longer being able to be introduced directly into the load support, but rather only still indirectly into the load support via the crossmember. At the beginning of such a crash situation, by further movement of the vehicle and corresponding penetration of the object in the form of the central pillar, the crossmember is deformed counter to the direction of travel. A bending line therefore forms, and therefore the crossmember, which can likewise also be designed as an impact support, deforms back counter to the direction of travel. In other words, a tilting of the crossmember from the outside inward as it were takes place. This furthermore leads to the deformation modules in the event of an impact of a central pillar now no longer carrying out any linear deformation, but rather executing a tilting movement. Said tilting movement is produced by the central action of the central pillar in the form of the object and the formation in this way of the inwardly curved bending line. In other words, the deformation boxes now collapse from the outside inward, and therefore said tilting movement can subsequently also be passed on to the load supports. The load supports can then also buckle inward along said tilting movement and can therefore ensure an additional deformation without having to permit the object to penetrate into the passenger interior of the vehicle.

As becomes apparent from the above explanation, an advantageous carrying away of the load can now be ensured even in the particular case of a crash situation with a central pillar. Owing to the fact that, contrary to the known solutions, no linear deformation takes place in the event of a central action of load on the crossmember, but rather buckling inward is carried out, the tensile loadings on the connecting portions between the individual components, i.e. in particular between the crossmember and the deformation modules and also between the deformation modules and the associated load supports are significantly reduced. A reduced tensile stress in the particular case of the crash situation with a central pillar leads to the corresponding force-transmitting connections being able to be designed more simply and lighter and therefore also more cost-effectively. For example, lighter weld seams are possible or corresponding stabilization plates or stabilization elements on the individual components can be omitted.

According to embodiments of the invention, the same or even improved stability can be provided by a load introduction system for a crash situation, even in the particular case of a central pillar. This is associated with a reduction in the costs, the weight and the outlay on production for such a load introduction system. Of course, a secondary benefit because of the reduction in weight is the customarily important fuel consumption in vehicles or the range in the case of electric drives.

According to an embodiment, the crossmember can be connected in a force-transmitting manner to the two deformation modules via an axis of rotation. Within the context of the present invention, an axis of rotation can be understood as meaning a portion which, by means of its structural configuration, permits rotation of the connected component relative to the opposite connected component. This case therefore involves the connection between the crossmember and the respective deformation modules. Under the action of a load, the force-transmitting connection in the form of an axis of rotation permits a rotatory movement of the crossmember relative to the respective deformation module. This can be formed, for example, by corresponding hinge elements. However, it is preferred if the force-transmitting connection is configured simply and cost-effectively, for example in the form of a corresponding weld seam. The corresponding weld seam can be arranged here preferably along said axis of rotation in order to ensure or to support said rotatory movement. An axis of rotation within the context of this embodiment supports the buckling, as has already been explained in more detail with regard to claim 1. The buckling by means of the axis of rotation is therefore improved even further and the advantages according to the invention can thereby be obtained even more reliably or with an intensified effect.

In the case of a load introduction system according to an embodiment of the invention, the axis of rotation is arranged on the outer side of the respective deformation module with respect to the direction of travel of the vehicle. The arrangement on the outer side of the respective deformation module leads to undesirable tensile stresses being reduced even further. In fact, the axis of rotation draws as it were the entire deformation module from the outer side in the direction of the inner side, and therefore tensile stresses on the inner side of the deformation module can be reduced preferably with further connecting points between the crossmember and the respective deformation module. The stability of the entire system of the load introduction system can thereby be further improved without increasing the weight.

In the case of a load introduction system according to an embodiment of the invention, the two deformation modules have a first deformation portion which is in the vicinity of the crossmember and is less mechanically stable than at least one second deformation portion which is further from the crossmember. The first deformation portion is therefore arranged with respect to the crossmember closer to the latter than the second deformation portion. Accordingly, the first deformation portion buckles under a smaller load or in a crash situation earlier because of the lower mechanical stability than is the case for the second deformation portion. In order to explain this in more detail, the crash situation with a central pillar is mentioned once again. As soon as the striking of a central pillar in the form of an object causes the crossmember to be distorted and preferably a rotational movement of the crossmember relative to the deformation modules takes place about the axes of rotation already explained, a deformation of the individual deformation modules is also carried out. This deformation is now supported in a targeted manner by the predetermined deformation portions, as the first and second deformation portions may also be referred to. Thus, at the beginning of the deformation, first of all the respective first deformation portion is deformed, and therefore a further rotation or further buckling inward is supported. The subsequent deformation of the second deformation portions, which can take place in an entirely completed form after the finished deformation of the first deformation portions, but also in transition together with the first deformation portions, further supports said inwardly buckling effects.

In the case of a load introduction system according to an embodiment of the invention, the two deformation portions of the two deformulation modules are arranged on the inner side with respect to the direction of travel. This is a particularly simple and cost-effective structural embodiment possibility in order to further improve or constructionally to support the buckling inward as an inventive concept.

In the case of a load introduction system according to an embodiment of the invention, the two deformation modules are designed and arranged in a mirror-inverted manner. This firstly relates to the geometrical arrangement and the design of the corresponding deformation modules, but in particular also to the type and design of the respective axis of rotation or to the type and design of the respective deformation portions. In particular, a symmetrical buckling behavior is thereby provided, and therefore an undesirable rotational movement or the undesirable introduction of torques in a crash situation, in particular with a central pillar, is avoided or can be reduced to a minimum.

In the case of a load introduction system according to an embodiment of the invention, the crossmember has a kink-free or a substantially kink-free bending line under the action of a load counter to the direction of travel. The bending line should be understood as meaning the mutual fiber of the respective component. The bending line therefore divides regions of internal tensile stress from regions of internal compressive stress from one another. In other words, the bending line indicates an idealized form of the deflection of the crossmember. If the structural embodiment of the crossmember leads to a kink in the bending line upon the central striking of a pillar, the effect according to the invention could only still be provided in relatively small parts. In other words, a kink-free or substantially kink-free bending line leads likewise to improving or supporting the desired inward buckling of the overall system of the load introduction system.

In the case of a load introduction system according to an embodiment of the invention, the two load supports have a buckling region on the inner side of the respective load support with respect to the direction of travel. A further inward buckling is additionally also supported here. In a final phase of the crash situation or at high load inputs, not only are the crossmember and the deformation modules deformed, but furthermore also an action on the load supports in a deforming manner is also effective. By means of the buckling regions which are likewise provided with reduced mechanical stability for the surrounding formation of the two load supports, the respective load support can now also buckle inward in the direction of the bulkhead partition. The entire buckling system therefore leads to not only the deformation modules and the crossmember, but also the two load supports providing or assisting this buckling functionality in the manner according to the invention.

In the case of a load introduction system according to an embodiment of the invention, the two load supports are designed and arranged in a mirror-inverted manner. As has already been explained with respect to the deformation modules, the mirror-inverted arrangement and design will be understood both with respect to the geometry and with respect to the mechanical stability. In both cases, this symmetrical design leads to symmetrical buckling being associated with symmetrical deformation and with symmetrical distribution of load in the region of the load introduction system.

In the case of a load introduction system according to an embodiment of the invention, the buckling regions of the load supports are arranged in front of a bulkhead partition of the vehicle. The bulkhead partition is customarily that region of the vehicle which separates the front region of the vehicle from the interior of the vehicle. By means of buckling already taking place in front of said bulkhead partition, it is ensured that the penetration of components or the introduction of corresponding loads is avoided or can be reduced by the prior buckling.

FIGS. 1 to 5 show a load introduction system 10 according to the present invention. This load introduction system 10 is illustrated here in a crash situation with a central object 200 which can also be understood as meaning a central pillar. The individual phases of the deformation show how the deformation is carried out under a load effect of differing strength. Depending in each case on the impact speed and corresponding magnitude of the load to be introduced, the deformation will pass through only some of the deformation steps explained below or, in the case of high load inputs, will carry out all of the deformations. In all deformation cases, i.e. both with a slight deformation according to FIGS. 1 to 2 or 1 to 3, but also in the case of severe deformation between FIGS. 1 to 5, the advantage according to the invention of buckling of the load introduction system 10 inward can readily be seen in all cases.

FIG. 1 shows how a load introduction system 10 is arranged on a vehicle 100 in the front region 110 thereof. Two load supports 20 and 30 can thus be connected to a body of the vehicle 100 or can already form parts of said body of the vehicle 100. A left load support 20 and a right load support 30, with respect to the direction of travel FR, can be seen here. Likewise in the front region 110 of the vehicle 100, a left deformation module 40 and a right deformation module 50 can be seen here. With respect to the direction of travel FR, an inner region can already be seen here by the inner sides 44 and 54 of the two deformation modules 40 and 50. Accordingly, the two deformation modules 40 and 50 also have associated outer sides 42 and 52. A force-transmitting connection is provided to the rear counter to the direction of travel FR between the deformation modules 40 and 50 to the respective load support 20 and 30, such as the crossmember 60 connecting the two deformation modules 40 and 50.

Figure 2:
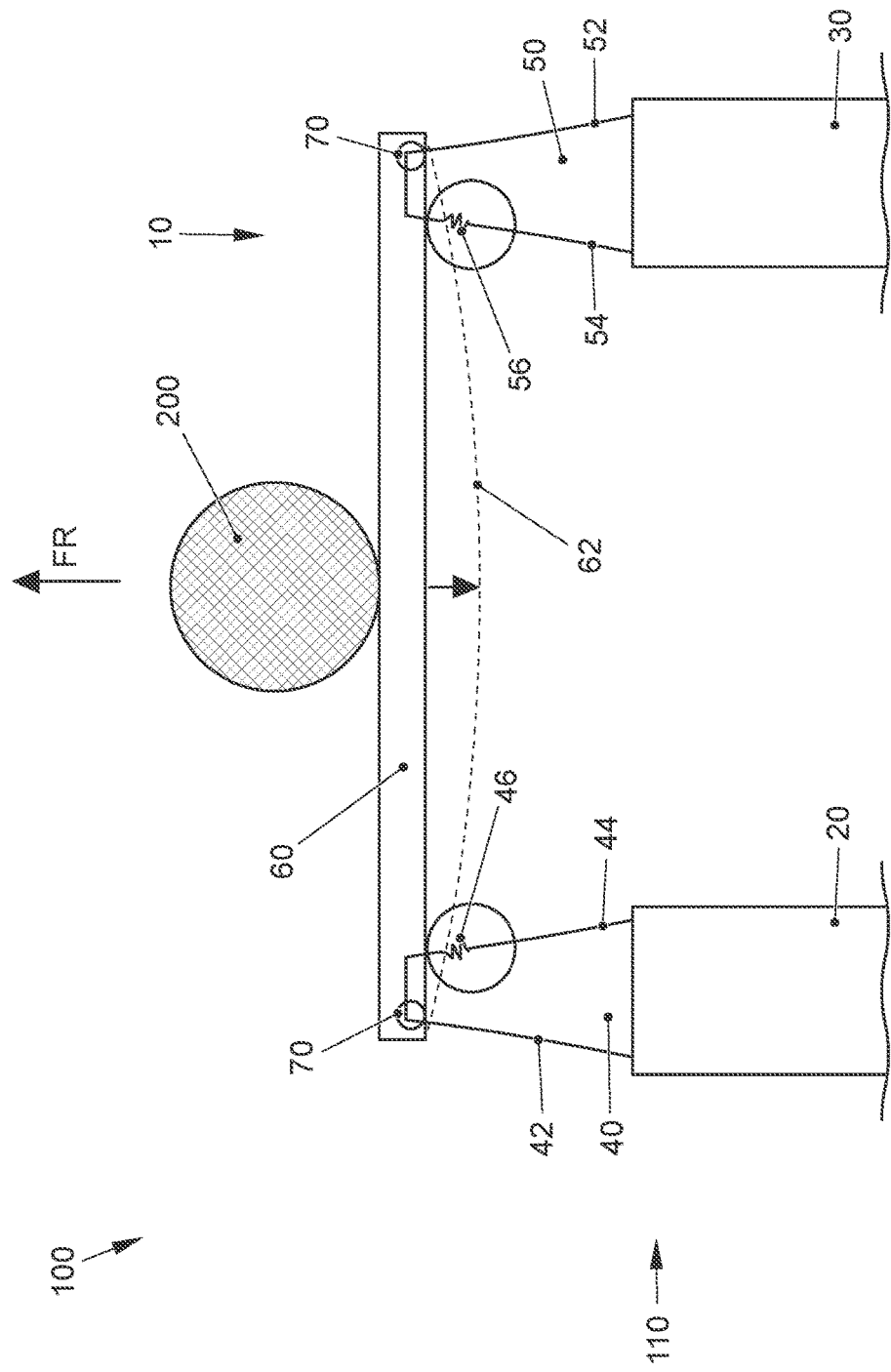
FIG. 2 shows the embodiment of FIG. 1 during the striking of the object.
Figure 3:
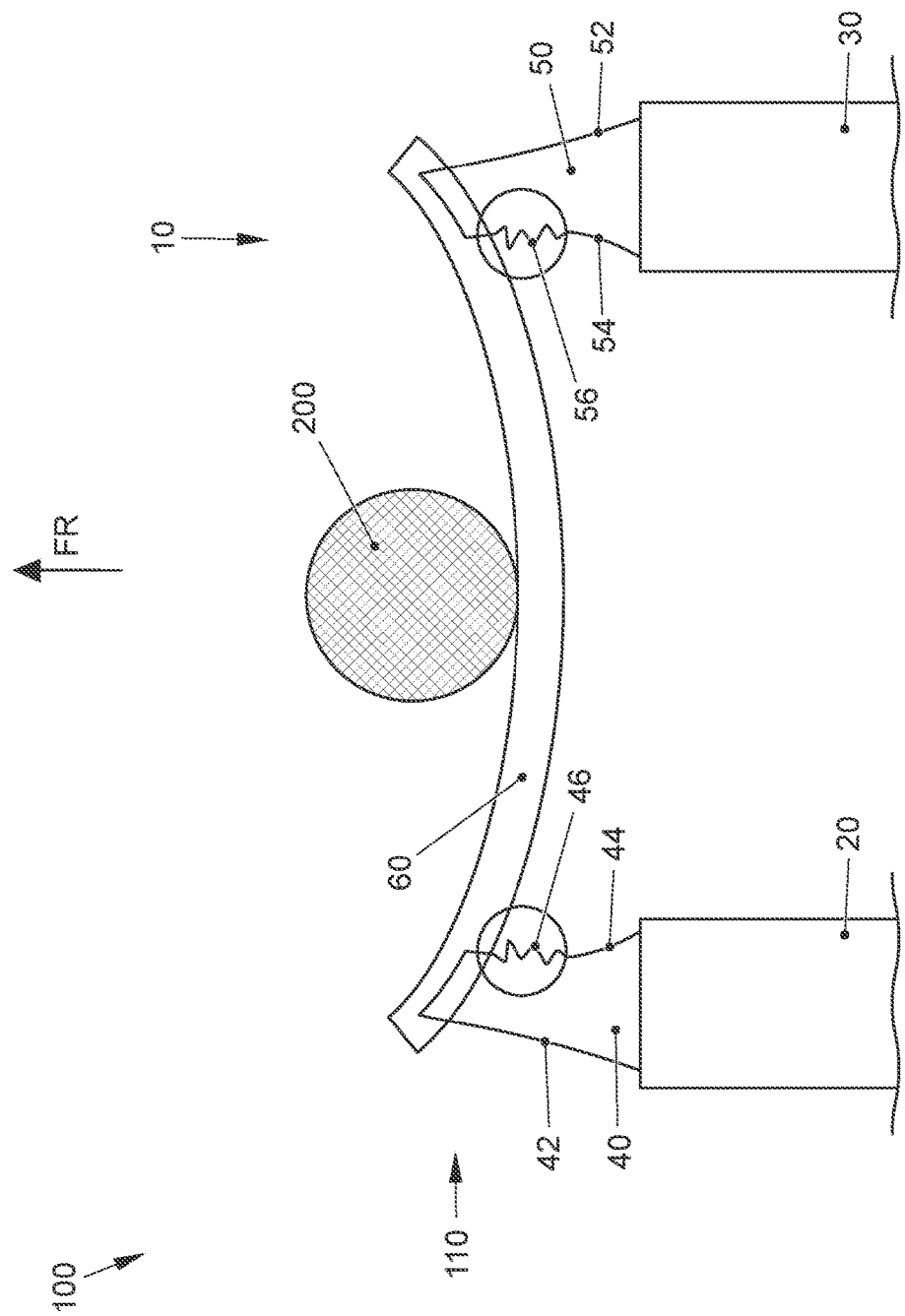
FIG. 3 shows the embodiments of FIGS. 1 to 2 in a further deformation phase.

As soon as the central object 200 then strikes against the crossmember 60, the latter will begin to be deformed counter to the direction of travel FR, as FIG. 2 already shows. During this deformation, the force-transmitting connection between the crossmember 60 and the two deformation modules 40 and 50 then acts in each case as an axis of rotation 70. Said axis of rotation 70 can be designed here, for example, as a weld seam which is oriented perpendicular to the plane of the drawing in FIG. 2. Said axis of rotation reduces the tensile stress or the tensile loading on further connecting elements between the respective deformation module 40 and 50 and the crossmember 60. Upon further buckling, it can now be seen with reference to the dashed bending line 62 in FIG. 2 how not only the axis of rotation 70 deploys its effect, but furthermore a first deformation portion 46 and 56 of the two deformation modules 40 and 50 carry out a first deformation. The result of this first deformation is illustrated in FIG. 3. The two first deformation portions 46 and 56 of the two deformation modules 40 and 50 are deformed here. The same also applies to the crossmember 60 which has likewise arrived at its bending line 62 counter to the direction of travel FR. If the crash situation is a relatively minor accident with a minor or low load input, it may be that the load input is already at an end at this time according to FIG. 3.

Figure 4:
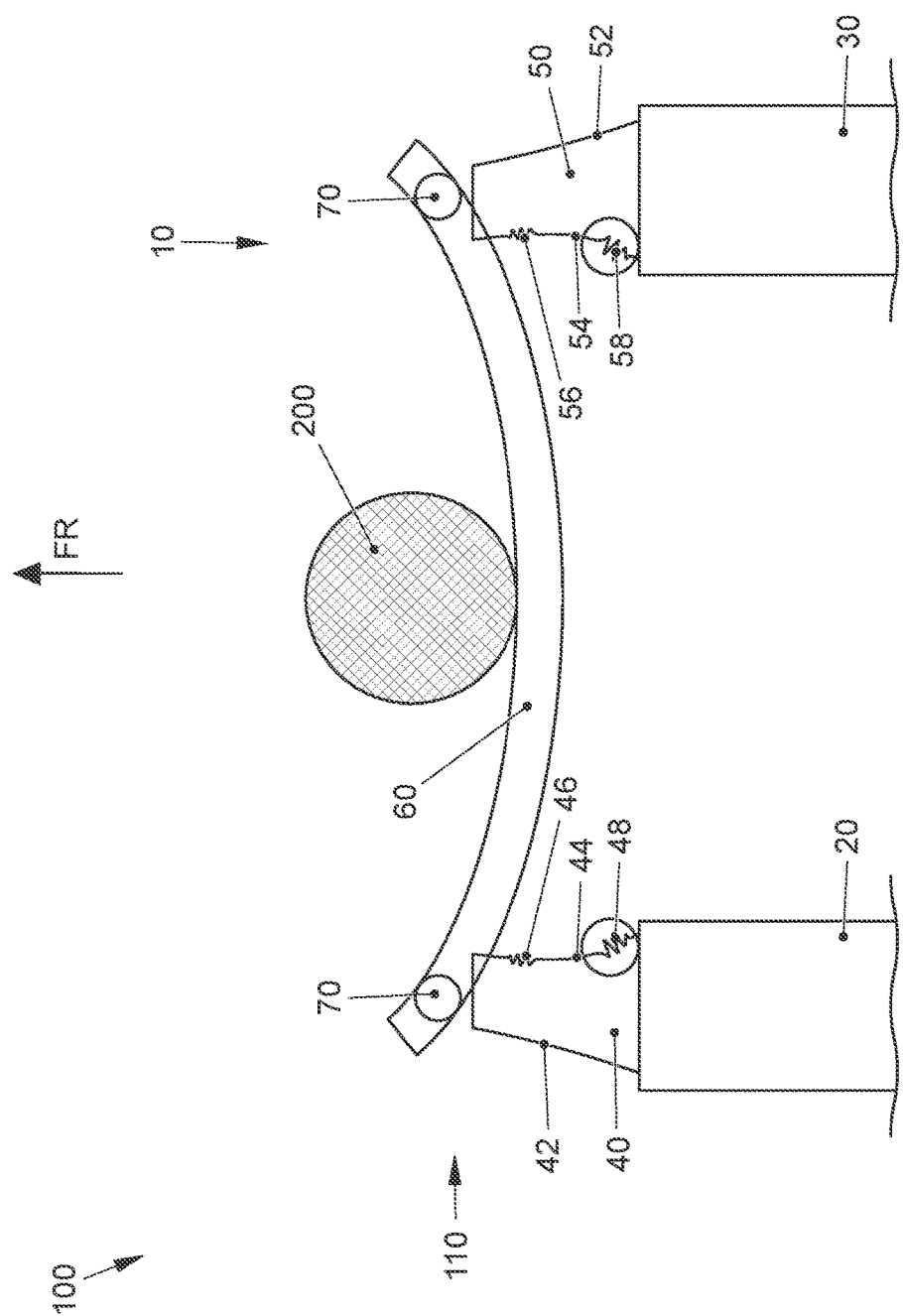
FIG. 4 shows the embodiments of FIGS. 1 to 3 in a further deformation phase.
Figure 5:
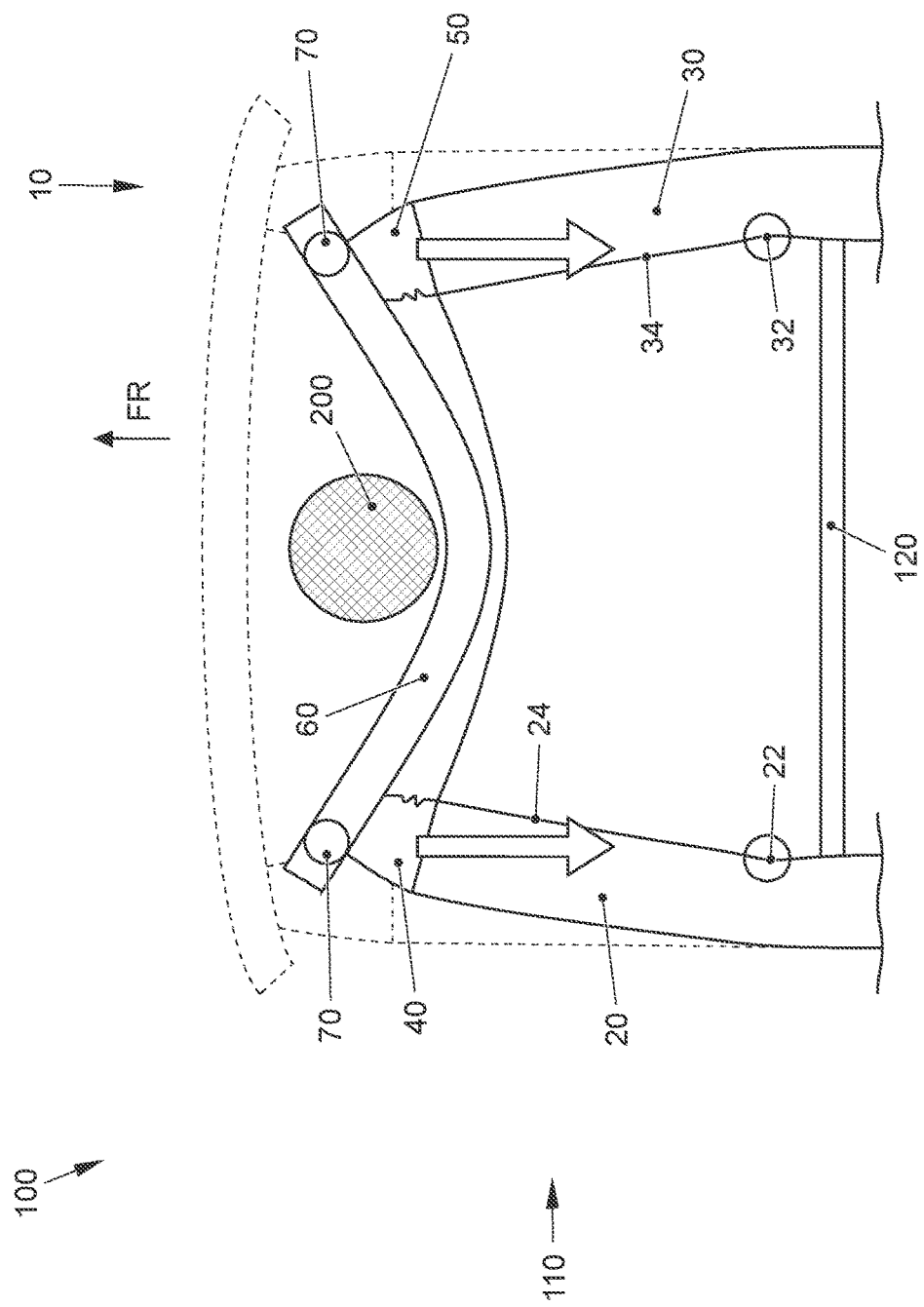
FIG. 5 shows the embodiments of FIGS. 1 to 4 in a further deformation phase.

However, if the crash situation involves a more severe accident or an action of a higher load, the deformation will proceed further in order to dissipate the crash energy. This is illustrated in FIG. 4. A further load input leads, firstly, to the crossmember 60 being rotated even further about the respective axis of rotation 70 relative to the two deformation modules 40 and 50. Since, at this time, the two first deformation portions 46 and 56 are already completely or substantially completely deformed, an additional deformation of the two further second deformation portions 48 and 58 then follows, said deformation portions having a greater mechanical stability than the two first deformation portions 46 and 56. It should be pointed out that the first and the second deformation portions 46, 48, 56 and 58 are deformable not only in a subordinate manner in terms of time, i.e. sequentially, but, depending on their embodiment, can also have a transition in which the two deformation portions 46 and 48 or 56 and 58 are subject to deformation together. As can be seen in FIG. 4, the two deformation regions 46, 48, 56 and 58 of the two deformation modules 40 and 50 are arranged on the inner side 44 and 54 of the two deformation modules 40 and 50. In comparison to FIG. 3 or FIG. 2, a rotational movement is thereby reinforced even further, wherein the crossmember now no longer carries out a rotation about the axis of rotation 70 only relative to the respective deformation module 40 and 50, but in addition, because of the deformation of the individual deformation regions 46, 48, 56 and 58, rotation takes place relative to the two load supports 20 and 30. Depending on the severity of the accident situation, the deformation can then also be ended here and no further deformation can take place. Upon further load input due to a high speed of the vehicle 100 or high load input, the deformation is continued, as will now be explained in more detail with FIG. 5. As soon as the deformation in the region of the crossmember 60 and the deformation modules 40 and 50 has ended or is partially also overlapping in time, the load supports 20 and 30 can then also be deformed. In order even further to improve or to support the buckling action inward here and also to provide same in this final part of the deformation phase in a crash situation, the two load supports 20 and 30 are provided here on their respective inner side 24 and 34 with corresponding buckling regions 22 and 32. The latter then likewise permit a desired buckling inward in the direction of the bulkhead partition 120 in a specific manner by means of reduced mechanical stability. The overall effect of a buckling functionality inward is also supported by said two buckling regions 22 and 32. As can be seen from the overall view of FIGS. 1 to 5, it can now be ensured with certainty for very different accident situations, in particular with load inputs of differing magnitude, that, by avoiding high tensile stresses between the individual components or in the individual components, no penetration of said individual components through the bulkhead partition 120 into an interior of the vehicle 100 takes place. The desired accident safety is thereby possible with a reduced structural outlay, with a reduced outlay on production and especially, by the reduction of the mechanical stability of the individual non-positive connections, also with a reduced weight.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A load introduction system of a vehicle for introducing a load counter to the direction of travel of the vehicle, the load introduction system comprising:
   a left load support on a left side of the vehicle and a right load support on a right side of the vehicle, wherein the left load support is connected in a force-transmitting manner to a left deformation module on the left side of a front portion of the vehicle and the right load support is connected in a force-transmitting manner to a right deformation module on the right side of the front portion of the vehicle; and
   a crossmember which extends in a transverse direction with respect to the direction of travel of the vehicle,
   wherein the crossmember is connected in a force-transmitting manner to the left deformation module by a left weld seam that forms a first axis of rotation along which the crossmember is configured to, during a deformation of the left deformation module, rotate relative to the left deformation module, and
   wherein the crossmember is connected in a force-transmitting manner to the right deformation module by a right weld seam that forms a second axis of rotation along which the crossmember is configured to, during a deformation of the right deformation module, rotate relative to the right deformation module.

2. The load introduction system as claimed in claim 1, wherein the left weld seam that forms the first axis of rotation is arranged on a left outer side of the left deformation module and the right weld seam that forms the second axis of rotation is arranged on the right outer side of the right deformation module.

3. The load introduction system as claimed in claim 1, wherein the left deformation module includes a first deformation portion which is in the vicinity of the crossmember and a second deformation portion which is further from the crossmember than said first deformation portion, the first deformation portion of the left deformation module being less mechanically stable than the second deformation portion of the left deformation module, and
   wherein the right deformation module includes a first deformation portion which is in the vicinity of the crossmember and a second deformation portion which is further from the crossmember than said first deformation portion, the first deformation portion of the right deformation module being less mechanically stable than the second deformation portion of the right deformation module.

4. The load introduction system as claimed in claim 3, wherein the first deformation portion and the second deformation portion of the left deformation modules are arranged on the right side of the left deformation module, and wherein the first deformation portion and the second deformation portion of the right deformation module are arranged on the left side of the right deformation module.

5. The load introduction system as claimed in claim 1, wherein the two deformation modules are designed and arranged in a mirror-inverted manner.

6. The load introduction system as claimed in claim 1, wherein the crossmember has a bending line that is substantially without kinks under the action of a load counter to the direction of travel.

7. The load introduction system as claimed in claim 1, wherein the left load support has a buckling region on the right side of the left load support and the right load support has a buckling region on the left side of the right load support.

8. The load introduction system as claimed in claim 7, wherein the two load supports are designed and arranged in a mirror-inverted manner.

9. The load introduction system as claimed in claim 7, wherein the buckling regions of the load supports are arranged in front of a bulkhead partition of the vehicle.

10. The load introduction system as claimed in claim 1, wherein both of the left weld seam that forms the first axis of rotation and the right weld seam that forms the second axis of rotation are oriented substantially perpendicular to both the direction of travel of the vehicle and to the transverse direction in which the crossmember extends.

* * * * *